United States Patent [19]

Crook et al.

[11] Patent Number: 5,473,212

[45] Date of Patent: Dec. 5, 1995

[54] VARISTOR DISK ASSEMBLY

[75] Inventors: James C. Crook; James E. McMillan, Sr., both of Raleigh; Raymond E. Welterlin, Cary; Lynn B. Williamson, both of Raleigh; John R. Holden, Raleigh; Murray J. Marvin, Durham, all of N.C.

[73] Assignee: Buehler Products, Inc., Cary, N.C.

[21] Appl. No.: 135,419

[22] Filed: Oct. 13, 1993

[51] Int. Cl.$^6$ .................................................. H02K 13/14
[52] U.S. Cl. .......................... 310/221; 310/220; 310/233
[58] Field of Search ................................... 310/220, 221, 310/222, 223, 233, 236

[56] References Cited

U.S. PATENT DOCUMENTS

| 2,470,096 | 5/1949 | Eck | 310/220 M X |
|---|---|---|---|
| 3,594,598 | 7/1971 | Schaub | 310/220 |
| 4,833,357 | 5/1989 | Tamura | 310/221 |
| 4,859,893 | 8/1989 | Wang | 310/234 |
| 5,008,577 | 4/1991 | Wang | 310/233 |
| 5,095,239 | 3/1992 | Wang | 310/221 |
| 5,293,092 | 3/1994 | Strobl | 310/233 |

FOREIGN PATENT DOCUMENTS

| 52-29906 | 7/1977 | Japan . |
|---|---|---|
| 746790 | 7/1980 | U.S.S.R. . |
| 2177854A | 1/1987 | United Kingdom . |

Primary Examiner—R. Skudy
Attorney, Agent, or Firm—Popham, Haik, Schnobrich & Kaufman, Ltd.

[57] ABSTRACT

A varistor disk assembly for mounting to a commutator base comprising a non-conductive retaining ring, a conductive member, and a varistor disk interposed between the commutator base and the distal end of the retaining ring. The retaining ring has an axial bore therethrough providing a friction fit with the motor shaft on which the commutator is mounted. A tolerance absorbing member can be interposed between the varistor disk and the retaining ring. The conductive member conducts current through its thickness from the commutator base to the varistor disk, but does not conduct current between adjacent commutator segments. To orient the varistor disk to the commutator, the proximal end of the retaining ring can have at least one planar side formed in its periphery for alignment with one of the commutator segments, while the distal end of the retaining ring also has formed in its periphery a planar side, and the varistor disk is provided with a complementary planar side in its inner diameter. Alternatively, the phenolic base of the commutator can be extended and molded with at least one planar side, which preferably is in alignment with one of the commutator segments, while the varistor disk is provided with a complementary planar side in its inner diameter.

22 Claims, 2 Drawing Sheets

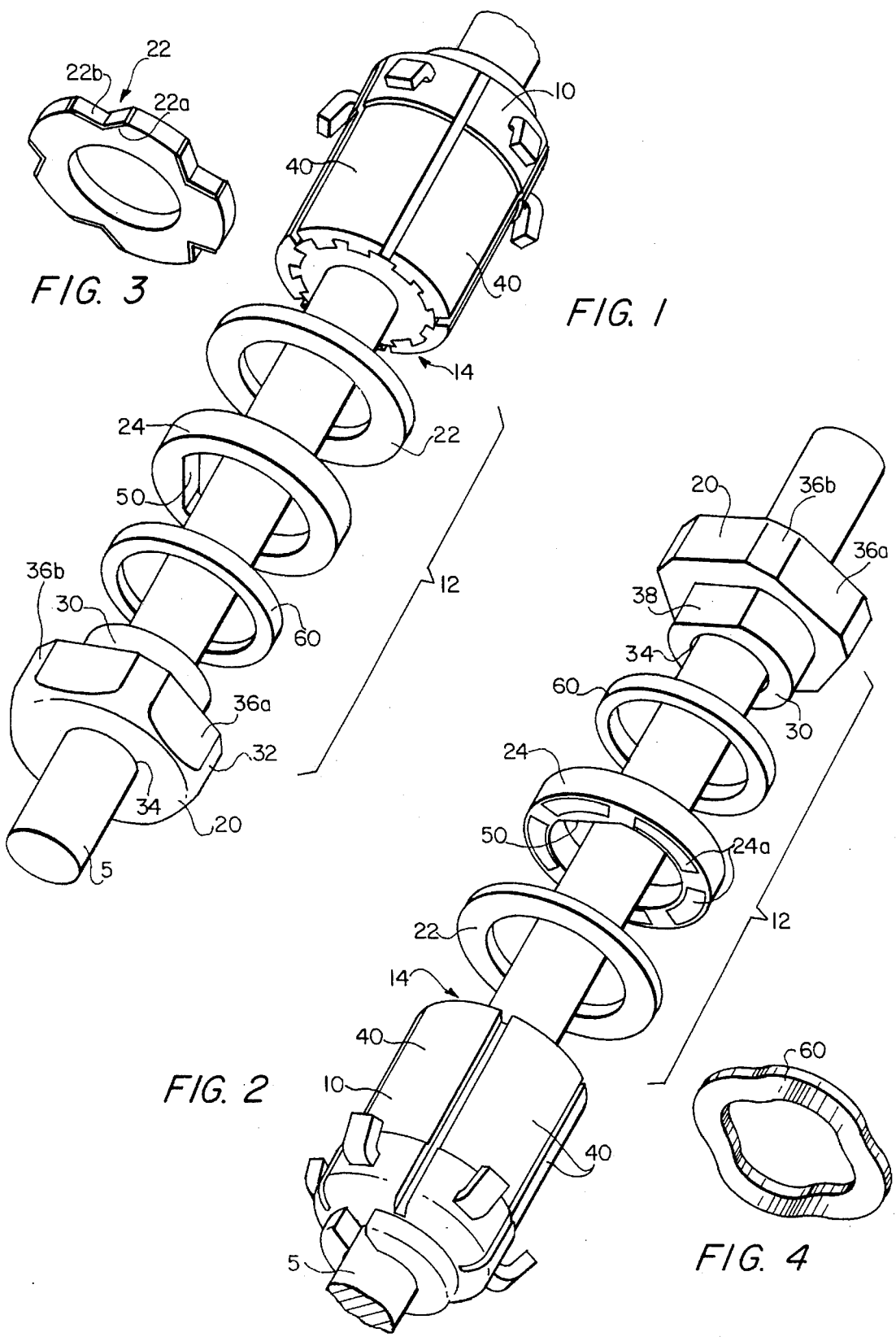

VARISTOR DISK ASSEMBLY

BACKGROUND OF THE INVENTION

1. Field of the Invention

The present invention relates to varistor disks. More specifically, the invention relates to a method and apparatus for mounting a varistor disk to the commutator of a motor without the need for soldering.

2. Related Art

As a motor runs, its brushes make and break contact with the commutator. The inductance of the motor windings prevents the current from changing instantly when the brushes break their connection. As a result, a large voltage is generated, creating sparks. These sparks have a lot of high frequency content, causing electro-magnetic interference (EMI).

Varistor disks are often used to suppress the EMI which can be generated by the brushes on a DC motor. A varistor has high resistance at low voltages and has lower resistance as the voltage increases. It is similar to two zener diodes connected back to back to provide the same effect regardless of the polarity of the voltage. In order to suppress the EMI, a varistor is usually soldered to the tangs of the commutator, thereby providing a varistor effect between adjacent commutator segments.

U.S. Pat. No. 4,859,893 (Wang) is illustrative of a commutator which uses a varistor to suppress EMI. The varistor is clamped onto the terminals of the commutator using a unitary plastic clamping member having a plurality of fingers which serve to protect the varistor ring from vibration which might cause the varistor to break.

British Patent No. 2,177,854A (Mabuchi) discloses the use of an electrically conductive rubber element to prevent EMI by suppressing sparks between motor brushes and respective commutator segments. The element is annular and is adhered to the terminal portions of the commutator by an electrically conductive adhesive.

Russian Patent No. 746790 (Selyaev) discloses the use of a dielectric ring to suppress sparking. The dielectric ring is bonded to the commutator using an epoxy which is coated on the non-metallized side of the ring.

Japanese Patent No. 29,906 (Morisawa) discloses the use of a variably conductive layer for reducing sparking between motor brushes and commutators.

Soldering of the varistor disk to the commutator tangs is a labor intensive operation not readily conducive to automation. Also, as successive parts of the varistor disk are heated during soldering, thermal stresses occur which can cause cracking of the varistor disk. Sometimes, there will be a cold solder joint, which will cause the loss of the suppression effect for the involved commutator segments. Although use of a conductive adhesive to adhere the varistor disk to the tangs avoids the thermal stresses resulting from soldering, it is only slightly less labor intensive than soldering and also is not conducive to automation.

It is the solution to these and other problems to which the present invention is directed.

SUMMARY OF THE INVENTION

It is therefore a primary object of the present invention to provide a method and apparatus for mounting a varistor disk to a motor commutator without the use of soldering.

It is another object of the present invention to provide a method and apparatus for mounting a varistor disk to a motor commutator which is automatable.

These and other objects of the invention are achieved by providing a non-conductive retaining ring, a conductive member, and a varistor disk interposed between the base of the commutator and the distal end of the retaining ring. The retaining ring has an axial bore therethrough dimensioned to provide a friction fit with the motor shaft on which the commutator is mounted.

A tolerance absorbing member can be interposed between the varistor disk and the retaining ring, if required. The tolerance absorbing member can take the form of a conventional wavy or spring washer or a compressible elastomer.

The conductive member must be a device which will conduct current through its thickness from the commutator base to the varistor disk, but not conduct current between adjacent commutator segments, which would short them out. The conductive member should also be compressible so as to accept some variation in commutator geometry and not exert stress on the varistor disk which would cause it to break.

The conductive member can be an elastomeric disk which has many conductive elements which conduct only through its thickness, but not from side to side. Alternatively, the conductive member can be an extruded rubber ring provided at its outer periphery with a v-shaped groove corresponding to each commutator segment, and further provided with a conductive layer of silver or other conductive metal extruded in the grooves. Also, the conductive member can be an insulating ring of rubber or plastic holding five discrete spring contacts.

In one embodiment according to the invention, the proximal end of the retaining ring is necked in; and the conductive member, the varistor disk, and the tolerance absorbing member all have inner diameters dimensioned to receive the necked-in proximal end of the retaining ring.

In order to orient the varistor disk to the commutator, the proximal end of the retaining ring has at least one planar side formed in its periphery for alignment with one of the commutator segments, the distal end of the retaining ring has formed in its periphery a planar side parallel to the planar side of the proximal end, and the varistor disk is provided with a complementary planar side in its inner diameter. Proper alignment of the planar side of the proximal end of the retaining ring with one of the commutator segments and of the varistor disk with the proximal end of the retaining ring thus results in proper alignment of the varistor disk with the commutator base.

In another embodiment according to the invention, the phenolic base of the commutator is extended and the metal bars of the ends of the commutator segments are exposed. The conductive member is placed over the commutator base extension, followed by the varistor disk, and the retaining ring. The proximal end of the retaining ring has a cylindrical recess formed therein dimensioned to receive the extended base of the commutator.

In order to orient the varistor disk to the commutator, the base extension is molded with at least one planar side in alignment with one of the commutator segments, and the varistor disk is provided with a complementary planar side in its inner diameter. Proper alignment of the varistor disk with the base extension thus results in proper alignment of the varistor disk with the commutator base.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 is an exploded, base-end perspective view of a commutator having a varistor disk assembly for mounting to its base in accordance with a first embodiment of the present invention.

FIG. 2 is an exploded, opposite-end perspective view of the commutator and varistor disk assembly of FIG. 1.

FIG. 3 is an alternative embodiment of the conductive member of FIG. 1.

FIG. 4 is an alternative embodiment of the tolerance absorbing member of FIG. 1.

DETAILED DESCRIPTION OF THE PREFERRED EMBODIMENTS

Figure 5:
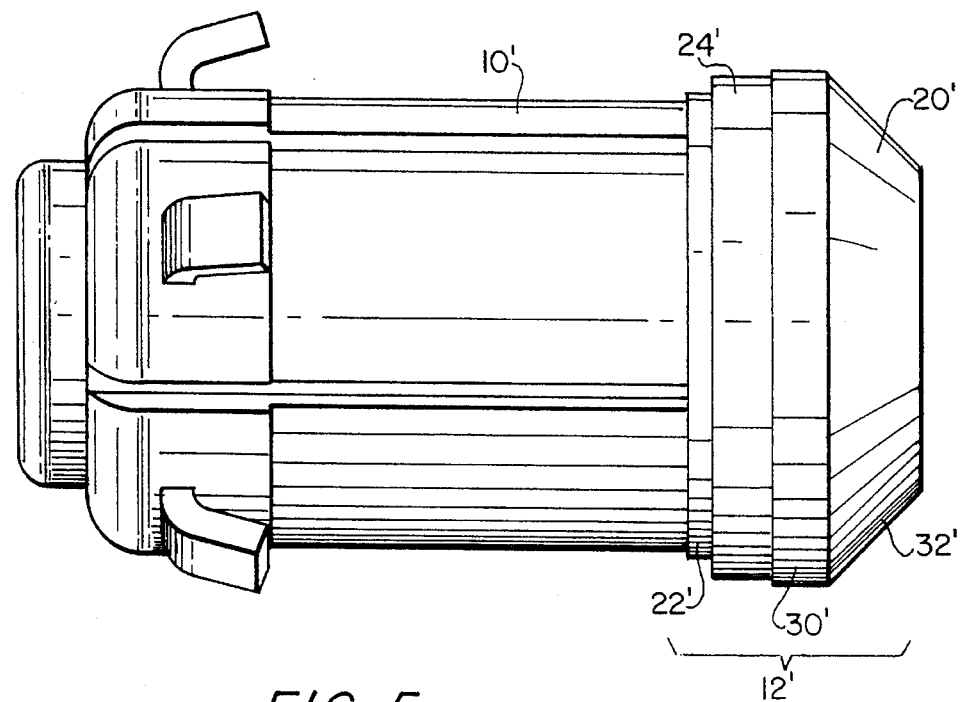
FIG. 5 is a side elevational view of a commutator having varistor disk assembly mounted to its base in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring now to FIGS. 1 and 2 there is shown a first embodiment of a portion of a motor armature in which a commutator 10 is concentrically mounted on a motor shaft S and a varistor disk assembly 12 is mounted to the commutator base 14 in accordance with the present invention. Varistor disk assembly 12 includes a retaining ring 20, a conductive member 22, and a varistor disk 24 having a plurality of solder pads 24a.

Retaining ring 20 has a necked-in proximal end 30 facing towards commutator 10, an expanded distal end 32 facing away from commutator 10, and a central axial bore 34 therethrough dimensioned to provide a friction fit for shaft S. As shown in FIGS. 1 and 2, the periphery of distal end 32 is formed with five longer planar sides or segments 36a alternating with five shorter sides or segments 36b, while the periphery of proximal end 30 is formed with a planar side 38. Planar sides 36a define alignment means by which retaining ring 20 can be aligned with commutator segments 40. Planar side 38 can be parallel to one of planar sides 36a, as shown in FIG. 2, but need not be, as long as the orientation is fixed to result in proper alignment of commutator segments 40 with varistor disk 24, as explained hereinafter.

Conductive member 22 and varistor disk 24 are interposed between retaining ring 20 and commutator 10, with conductive member 22 bearing against segments 40 of commutator 10 and solder pads 24a of varistor disk 24 bearing against conductive member 22.

The number of solder pads 24a on varistor disk 24 corresponds to the number of commutator segments 40, in this case, five. Conductive member 22 and varistor disk 24 are generally annular in shape, all having inner diameters dimensioned to enable them to pass freely over shaft S and to receive proximal end 30 of retaining ring 20. Varistor disk 24 is provided with a planar side 50 in its inner diameter complementary to planar side 38 of proximal end 30 of retaining ring 20. Proper alignment of proximal end 30 of retaining ring 20 with commutator segments 40 and of varistor disk 24 with proximal end 30 of retaining ring 20 thus results in proper alignment of the solder pads 24a of varistor disk 24 with commutator segments 40.

In order for varistor disk 24 to function properly, conductive member 22 must be in electrical contact with commutator segments 40 and varistor disk 24 must be in electrical contact with conductive member 22. If proximal end 30 of retaining ring 20 is longer than the combined thickness of varistor disk 24 and conductive member 22, then there will be play between varistor disk 24, conductive member 22, and commutator segments 40. To avoid this problem and ensure the proper electrical contact, a tolerance absorbing member 60 can if necessary be interposed between varistor disk 24 and retaining ring 20. Tolerance absorbing member 60 can take the form of a compressible elastomeric disk, as shown in FIG. 1, or a conventional spring or wavy washer, as shown in FIG. 4.

Conductive member 22 must be a device which will conduct current through its thickness from the commutator base to varistor disk 24, but not conduct current between adjacent commutator segments 40, which would short them out. Conductive member 22 should also be compressible so as to accept some variation in commutator geometry and not exert stress on varistor disk 24 which would cause it to break. Thus, as shown in FIG. 1, conductive member 22 can be an elastomeric disk which has many conductive elements (not shown) which conduct only through its thickness, but not from side to side.

Alternatively, as shown in FIG. 3, conductive member 22 can be an extruded rubber ring provided at its outer periphery with a groove 22a corresponding to each commutator segment 40, and further provided with a conductive layer 22b of silver or other conductive metal extruded in grooves 22a. As illustrated in FIG. 3, grooves 22a are v-shaped. However, grooves 22a can also be w-shaped, scalloped, rectangular, or any other shape which would permit the extrusion of conductive layers 22b at spaced locations on the outer periphery of conductive member 22. Also, conductive member 22 can be an insulating ring of rubber or plastic holding five discrete contacts (not shown) made of springs or other conductive material, e.g. silver-filled elastomer plugs.

Figure 6:
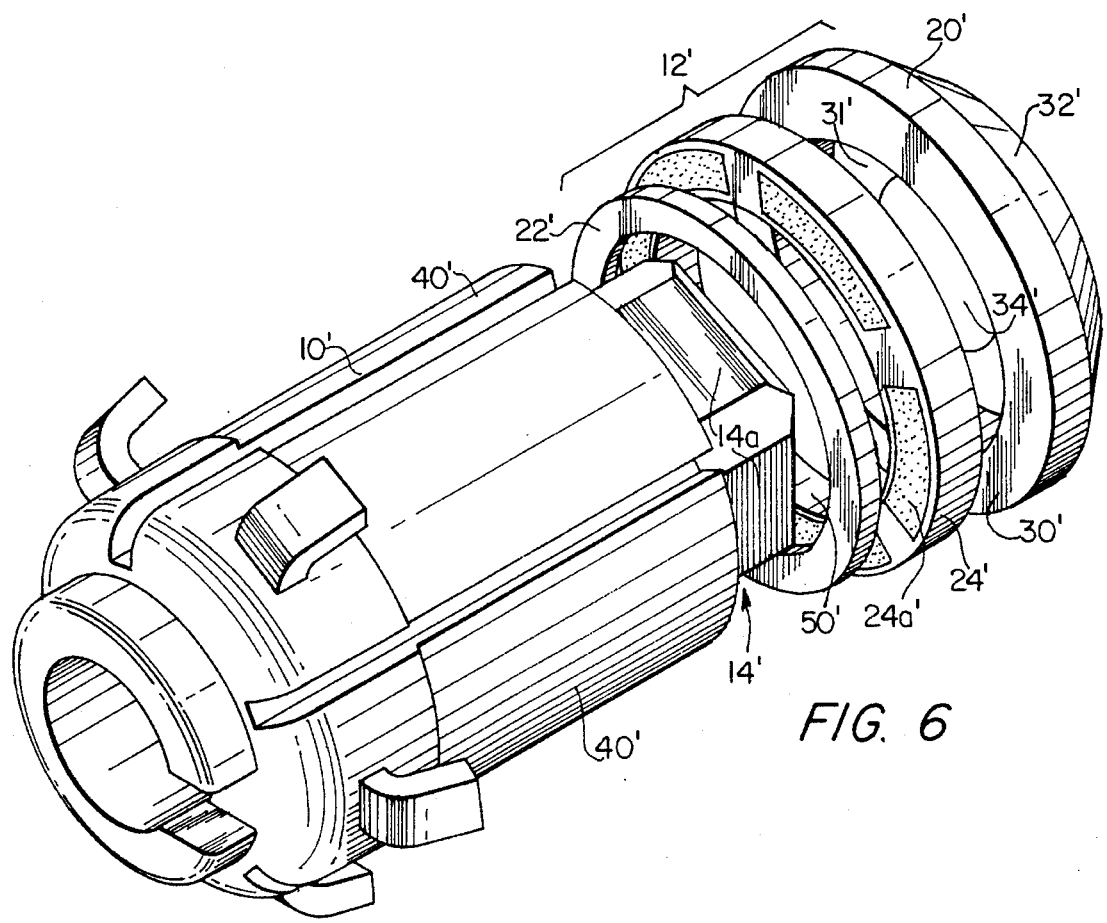
FIG. 6 is a perspective view of the commutator and varistor disk assembly of FIG. 5.

Referring now to FIGS. 5 and 6, there is shown a second embodiment of a commutator 10' concentrically mounted on a shaft (not shown) and having a varistor disk assembly 12' for mounting to the commutator base extension 14' in accordance with the present invention. Varistor disk assembly 12' includes a non-conductive retaining ring 20', a conductive member 22', and a varistor disk 24'.

In the embodiment of FIGS. 5 and 6, the phenolic base of commutator 10' is extended to form a commutator base extension 14' and the metal bars of the ends of the commutator segments 40' are exposed. Conductive member 22' is placed over commutator base extension 14', followed by varistor disk 24'. Retaining ring 20' is placed over commutator base extension 14' following varistor disk 24' to hold the assembly 12' together.

Retaining ring 20' has a proximal end 30' facing towards commutator 10' and having a recess 31' formed therein, a tapered distal end 32' facing away from commutator 10', and a central axial bore 34' therethrough dimensioned to provide a friction fit for the shaft. Recess 31' is dimensioned to seat base extension 14' therein. In order to orient varistor disk 24' to commutator 10', base extension 14' is molded with at least one planar side 14a', and varistor disk 24' is provided with a complementary planar side 50' in its inner diameter. Planar side 14a' can be aligned with one of commutator segments 40', as shown in FIG. 6, but need not be, as long as its orientation is fixed so that proper alignment of varistor disk 24' with base extension 14' results in proper alignment of solder pads 24a' of varistor disk 24' with the commutator base.

Conductive member 22' is substantially identical to conductive member 22 described above with respect to the first embodiment shown in FIGS. 1 and 2. A tolerance absorbing member 60 as described above can be used if required between retaining ring 20' and varistor disk 24' in order to insure proper contact between the various elements.

Modifications and variations of the above-described embodiments of the present invention are possible, as appreciated by those skilled in the art in light of the above teachings. For example, although commutators 10 and 10' as shown in FIGS. 1, 2, 5, and 6 have five segments, commutators with different numbers of segments are known, and the invention can be adapted accordingly, as will be appreciated by those of skill in the art, i.e. by changing the number of solder pads on the varistor disk and the number of sides on the proximal end of the retaining ring or the number of planar sides on the extension of the commutator base to correspond to the number of commutator segments.

In the case of a commutator having only three segments, it is noted that a separate conductive member may not be necessary, as three points geometrically define a plane in space, and a varistor disk would therefore be able to make contact with raised points at the commutator segments with the tolerance absorbing member and the retaining ring bearing against its distal side. However, for commutators having more than three segments, a compressive conducting member is required to assure contact between the commutator and the varistor disk.

It is therefore to be understood that, within the scope of the appended claims and their equivalents, the invention may be practiced otherwise than as specifically described.

What is claimed is:

1. A varistor disk assembly for mounting to a base of a commutator mounted on a motor shaft, the commutator having a plurality of peripheral segments, said varistor disk assembly comprising:

a non-conductive retaining ring, said retaining ring having an axial bore therethrough dimensioned to provide a friction fit with the motor shaft, a proximal end for orientation facing towards the commutator base, and a distal end for orientation facing away from the commutator base;

a conductive member configured to receive said shaft therethrough for placement at the commutator base, said conductive member being compressible and having a thickness; and a varistor disk configured to receive said shaft therethrough for interposition between said conductive member and said proximal end of said retaining ring, said conductive member being constructed to conduct current through its thickness from the commutator base to said varistor disk but not to conduct current between adjacent commutator segments.

2. The varistor disk assembly of claim 1, the commutator base includes an extension molded with at least one planar side, and the inner diameter of said varistor disk is provided with a planar side complementary to said planar side of said extension, said planar side of said extensions being oriented to result in proper alignment of said varistor disk with said commutator.

3. A varistor disk assembly for mounting to a base of a commutator mounted on a motor shaft, comprising:

a non-conductive retaining ring, said retaining ring having an axial bore therethrough dimensioned to provide a friction fit with the motor shaft, a proximal end for orientation facing towards the commutator base, and a distal end for orientation facing away from the commutator base;

a conductive member configured to receive said shaft therethrough for placement at the commutator base;

a varistor disk configured to receive said shaft therethrough for interposition between said conductive member and said proximal end of said retaining ring; and a tolerance absorbing member for interposition between said varistor disk and said retaining ring.

4. The varistor disk assembly of claim 3, wherein said tolerance absorbing member comprises a conventional wavy washer.

5. The varistor disk assembly of claim 3, wherein said tolerance absorbing member comprises a compressible elastomer.

6. The varistor disk assembly of claim 2, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

7. A varistor disk assembly for mounting to a base of a commutator mounted on a motor shaft, comprising:

a non-conductive retaining ring, said retaining ring having an axial bore therethrough dimensioned to provide a friction fit with the motor shaft, a proximal end for orientation facing towards the commutator base, and a distal end for orientation facing away from the commutator base;

a conductive member configured to receive said shaft therethrough for placement at the commutator base, wherein said conductive member comprises an extruded rubber ring provided at its outer periphery with a plurality of spaced grooves and a layer of conductive metal extruded in said grooves; and a varistor disk configured to receive said shaft therethrough for interposition between said conductive member and said proximal end of said retaining ring.

8. The varistor disk assembly of claim 1, wherein said proximal end of said retaining ring is necked in, and wherein said conductive member and said varistor disk are generally annular in shape and have inner diameters dimensioned to enable them to pass freely over the motor shaft and to receive said proximal end of said retaining ring.

9. The varistor disk assembly of claim 7, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

10. A varistor disk assembly for mounting to a base of a commutator mounted on a motor shaft, comprising:

a non-conductive retaining ring, said retaining ring having an axial bore therethrough dimensioned to provide a friction fit with the motor shaft, a proximal end for orientation facing towards the commutator base, and a distal end for orientation facing away from the commutator base, wherein said proximal end of said retaining ring is necked in, said distal end of said retaining ring has a periphery formed with at least one planar side, and said proximal end of said retaining ring has a periphery formed with a planar side;

a conductive member configured to receive said shaft therethrough for placement at the commutator base; and a varistor disk configured to receive said shaft therethrough for interposition between said conductive member and said proximal end of said retaining ring;

wherein said conductive member and said varistor disk are generally annular in shape and have inner diameters dimensioned to enable them to pass freely over the motor shaft and to receive said proximal end of said retaining ring, and the inner diameter of said varistor disk is provided with a planar side complementary to said planar side of said proximal end of said retaining ring, said planar side of said retaining ring being oriented to result in proper alignment of said varistor disk with said commutator.

11. The varistor disk assembly of claim 10, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

12. A motor armature comprising:

a motor shaft;

a commutator concentrically mounted on said motor shaft, said commutator including a base and a plurality of peripheral segments;

an annular conductive member encircling said motor shaft and positioned at said commutator base, said conductive member being compressible and having a thickness;

an annular varistor disk encircling said motor shaft and positioned adjacent to said conductive member, said conductive member being constructed to conduct current through its thickness from the commutator base to said varistor disk but not to conduct current between adjacent commutator segments; and a non-conductive retaining ring, said retaining ring having an axial bore therethrough dimensioned to provide a friction fit with the motor shaft, a proximal end oriented facing towards said commutator base, and a distal end oriented facing away from said commutator base.

13. The varistor disk assembly of claim 12, wherein said proximal end of said retaining ring is necked in, and wherein said conductive member and said varistor disk have inner diameters dimensioned to enable them to pass freely over said motor shaft and to receive said proximal end of said retaining ring.

14. The varistor disk assembly of claim 12, wherein said commutator base includes an extension formed with at least one planar side, and the inner diameter of said varistor disk is provided with a planar side complementary to said planar side of said extension, said planar side of said extension being oriented to result in proper alignment of said varistor disk with said commutator.

15. A motor armature comprising:

a motor shaft;

a commutator concentrically mounted on said motor shaft, said commutator including a base;

an annular conductive member encircling said motor shaft and positioned at said commutator base;

an annular varistor disk encircling said motor shaft and positioned adjacent to said conductive member;

a non-conductive retaining ring, said retaining ring having an axial bore therethrough dimensioned to provide a friction fit with the motor shaft, a proximal end oriented facing towards said commutator base, and a distal end oriented facing away from said commutator base; and a tolerance absorbing member interposed between said varistor disk and said retaining ring.

16. The varistor disk assembly of claim 15, wherein said tolerance absorbing member comprises a conventional wavy washer.

17. The varistor disk assembly of claim 15, wherein said tolerance absorbing member comprises a compressible elastomer.

18. The varistor disk assembly of claim 15, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

19. A motor armature comprising:

a motor shaft;

a commutator concentrically mounted on said motor shaft, said commutator including a base;

an annular conductive member encircling said motor shaft and positioned at said commutator base, wherein said conductive member comprises an extruded rubber ring provided at its outer periphery with a plurality of spaced grooves and a layer of conductive metal extruded in said grooves;

an annular varistor disk encircling said motor shaft and positioned adjacent to said conductive member; and a non-conductive retaining ring, said retaining ring having an axial bore therethrough dimensioned to provide a friction fit with the motor shaft, a proximal end oriented facing towards said commutator base, and a distal end oriented facing away from said commutator base.

20. The varistor disk assembly of claim 19, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

21. A motor armature comprising:

a motor shaft;

a commutator concentrically mounted on said motor shaft, said commutator including a base;

an annular conductive member encircling said motor shaft and positioned at said commutator base;

an annular varistor disk encircling said motor shaft and positioned adjacent to said conductive member; and a non-conductive retaining ring, said retaining ring having an axial bore therethrough dimensioned to provide a friction fit with the motor shaft, a proximal end oriented facing towards said commutator base, and a distal end oriented facing away from said commutator base wherein said proximal end of said retaining ring is necked in, and the periphery of said distal end of said retaining ring is formed with at least one planar side, the periphery of said proximal end of said retaining ring is formed with a planar side, and the inner diameter of said varistor disk is provided with a planar side complementary to said planar side of said proximal end of said retaining ring, said planar side of said retaining ring being oriented to result in proper alignment of said varistor disk with said commutator;

wherein said conductive member and said varistor disk have inner diameters dimensioned to enable them to pass freely over said motor shaft and to receive said proximal end of said retaining ring.

22. The varistor disk assembly of claim 21, wherein the commutator includes a plurality of peripheral segments, said conductive member is compressible and having a thickness, and said conductive member is constructed to conduct current through its thickness from the commutator base to said varistor disk but not to conduct current between adjacent commutator segments.

* * * * *

UNITED STATES PATENT AND TRADEMARK OFFICE
CERTIFICATE OF CORRECTION

PATENT NO. : 5,473,212
DATED : December 5, 1995
INVENTOR(S) : James C. CROOK et al.

It is certified that error appears in the above-identified patent and that said Letters Patent is hereby corrected as shown below:

Column 5,  Claim 2, line 63, after "1," insert --wherein--.

Column 6,  Claim 6, line 25, delete "2" and insert in place thereof --3--.

Claims 13, 14, 16, 17, 20, and 22, delete "varistor disk assembly" and insert in place thereof --motor armature--.

Signed and Sealed this

Twenty-fifth Day of June, 1996

Attest:

BRUCE LEHMAN

*Attesting Officer*     Commissioner of Patents and Trademarks